(12) United States Patent
Duquesnois

(10) Patent No.: US 6,859,497 B2
(45) Date of Patent: Feb. 22, 2005

(54) COMMAND FRAMES AND A METHOD OF CONCATENATING COMMAND FRAMES

(75) Inventor: Laurent Michel Olivier Duquesnois, San Mateo, CA (US)

(73) Assignee: Koninklijke Philips Electronics N.V., Eindhoven (NL)

(*) Notice: Subject to any disclaimer, the term of this patent is extended or adjusted under 35 U.S.C. 154(b) by 463 days.

(21) Appl. No.: 10/074,775

(22) Filed: Feb. 12, 2002

(65) Prior Publication Data
US 2002/0114345 A1 Aug. 22, 2002

(30) Foreign Application Priority Data
Feb. 16, 2001 (FR) .............................. 01 02135

(51) Int. Cl.$^7$ ................................ H04N 7/12
(52) U.S. Cl. ................ 375/240.26; 348/425.1
(58) Field of Search ................ 375/240.26; 348/425.1

(56) References Cited

U.S. PATENT DOCUMENTS

| | | | | |
|---|---|---|---|---|
| 4,023,023 A | * | 5/1977 | Bourrez et al. | 708/490 |
| 5,526,484 A | * | 6/1996 | Casper et al. | 709/237 |
| 6,779,195 B2 | * | 8/2004 | Oishi et al. | 725/68 |
| 6,792,047 B1 | * | 9/2004 | Bixby et al. | 375/240.26 |

OTHER PUBLICATIONS

Eleftheriadis, Alexandros and Puri, Atul, MPEG–4: An object–based multimedia coding standard supporting mobile applications, 1998, Baltzer Science Publishers, Mobile Networks and Applications 3, pp. 3–32.*

* cited by examiner

Primary Examiner—Chris Kelley
Assistant Examiner—Matthew Haney

(57) ABSTRACT

A command frame according to the invention comprises at least one last command with a continue bit, and a number of padding bits so that the frame occupies an integer number of words. It is designed to allow the position of the continue bit of last command to be determined. A method according to the invention of concatenating a first and a second command frame comprises the following steps:

Figure 1:
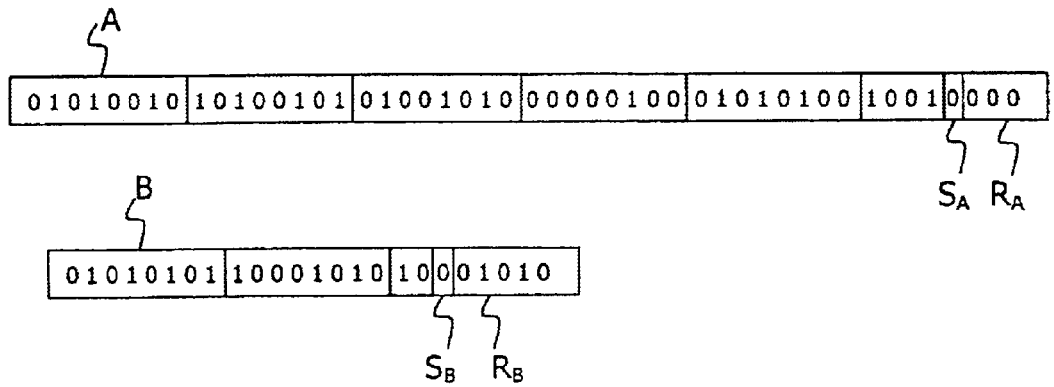

a) determination of the position of the continue bit of the last command of the first frame,
b) modification of the continue bit of the last command of the first frame,
c) suppression of the non-significant bits of the first frame,
d) insertion of at least one command from the second frame after the modified continue bit,
e) addition of a number of padding bits in order to form a new frame that occupies an integer number of words.

11 Claims, 2 Drawing Sheets

COMMAND FRAMES AND A METHOD OF CONCATENATING COMMAND FRAMES

The invention relates to a method of concatenating a first and a second frame each containing one or more commands, including a last command which contains a continue bit positioned so as to indicate whether another command is to follow in the frame or not.

The invention also relates to an electronic apparatus equipped with means for implementing a concatenation method of this kind, and a transmission system comprising an electronic apparatus of this kind. The invention also relates to a computer program comprising instructions for implementing a command concatenation method of this kind, when executed by a processor.

The invention also relates to a command frame comprising at least a last command with a continue bit, and a number of padding bits such that the frame occupies a integer number of words. It also relates to an electronic apparatus equipped with means for transmitting a command frame of this kind.

Finally, the invention relates to a method of forming an access point to a data stream which utilizes a concatenation method of this kind.

The invention is particularly applicable in the field of multimedia scene description. It is applicable, for example, in content editing tools.

The MPEG4 standard is described particularly in the document ISO/IEC 14496-1 entitled "Information Technology—Coding of audio-visual objects—part 1: systems" published by the ISO in 1999.

This standard describes means for individual coding of audio, visual and audio-visual objects, and means for composing multimedia scenes from objects of this kind. The information required for the composition of a scene forms the description of the scene.

This concept of scene description is set out in paragraph 9 of the MPEG-4 standard. To summarize, in the MPEG-4 standard, scene descriptions have a tree-like structure. Each node in the structure corresponds to an object and contains a set of parameters, particularly parameters for placing the object in time and space. A tree-like structure of this kind is not static: the parameters of the nodes can be modified and nodes can be added, replaced and removed.

The MPEG-4 standard defines two types of command relating to scene descriptions: on the one hand, a scene replacement command which contains a full scene description, and on the other hand, scene modification commands which contain modifications to be made to a scene description. These scene replacement and modification commands form part of a datastream currently referred to as a BIFS (Binary Format for Scene description). They are referred to as BIFS commands in the remainder of the description.

The syntax of BIFS commands is described in chapter 9.3.6 of the MPEG-4 standard. In particular, according to paragraph 9.3.6.2, a BIFS command is transmitted in a command frame, where each command frame can comprise one or more BIFS commands. In a command frame, each BIFS command is terminated by a continue bit, the function of which is to indicate to the decoder if another BIFS command is to follow in the same command frame.

One of the objects of the invention is to present a method of concatenating command frames that is particularly applicable to BIFS command frames.

A concatenation method according to the invention:
is applicable to a first and a second frame each containing one or more commands, including a last command, the commands in a frame comprising a continue bit positioned so as to indicate whether another command is to follow in the frame or not, said frames comprising a number of non-significant bits among which a number of padding bits such that they occupy an integer number of words, at least said first frame being designed to allow the position of the continue bit of its last command to be determined, and comprises the following steps:

a) determination of the position of the continue bit of the last command of the first frame, b) modification of the continue bit of the last command of the first frame, c) suppression of the non-significant bits of the first frame, d) insertion of at least one command from the second frame after the modified continue bit, e) addition of a number of padding bits in order to form a new frame that occupies an integer number of words.

In a first embodiment, said non-significant bits comprise a supplementary word placed after the padding bits, said padding bits being placed after the continue bit of the last command of the frame, and the supplementary word indicates the number of padding bits.

In this first embodiment, the invention therefore consists in adding a supplementary word to command frames, said supplementary word allowing the position of the continue bit of the last command to be determined. It is then possible to find this continue bit in the command frame, and to modify its value so as to add one or more other commands after this continue bit.

In a second embodiment, said padding bits are configured to an inverse value of that of said continue bit so as to allow the position of said continue bit to be determined. This embodiment allows a saving of the supplementary word utilized in the first embodiment.

Another object of the invention is to present a command frame format allowing to apply a concatenation method according to the invention.

In a first embodiment, a command frame according to the invention comprises at least one last command with a continue bit, a number of padding bits such that the frame occupies an integer number of words, and a supplementary word placed after the padding bits, said padding bits being placed after the continue bit, said supplementary word indicating said number of padding bits.

In a second embodiment, a command frame according to the invention comprises at least one last command with a continue bit, and a number of padding bits such that the frame occupies an integer number of words, said padding bits being configured to an inverse value of that of said continue bit.

Still another object of the invention is to present an advantageous application of a concatenation method as described above.

The MPEG-4 standard allows a server to send scene descriptions to one or more clients, and subsequently to transmit updates to the scene descriptions already sent. The replacement commands then form points of access to the stream, that is to say points by which a client can connect to the stream.

The invention presents a method of forming an access point to a data stream that is applicable particularly to a BIFS stream, which comprises a step of storing command frames relating to a scene description, a step of storing at least one command frame relating to at least one scene modification, and a step of applying a concatenation method as described above, in order to concatenate said command frame relating to a scene description with said command frame relating to at least one scene modification, said access point being formed from the result of said concatenation.

Such a method of forming an access point, which comprises a step of storing scene replacement frames when they are encoded, in order to reutilize them subsequently for forming an access point to the stream, allows to avoid re-encoding a scene description each time an access point is to be inserted. A method of forming access points according to the invention offers the additional advantage of allowing a scene to be displayed directly in which scene a modification is taken into account. Where, contrary to the invention, the scene replacement command and the scene modification command are transmitted in two separate command frames, the decoder in fact successively displays the scene without the modification and then the scene with the modification.

These and other aspects of the invention are apparent from and will be elucidated, by way of non-limiting example, with reference to the embodiment(s) described hereinafter.

IN THE DRAWINGS

Figure 2:
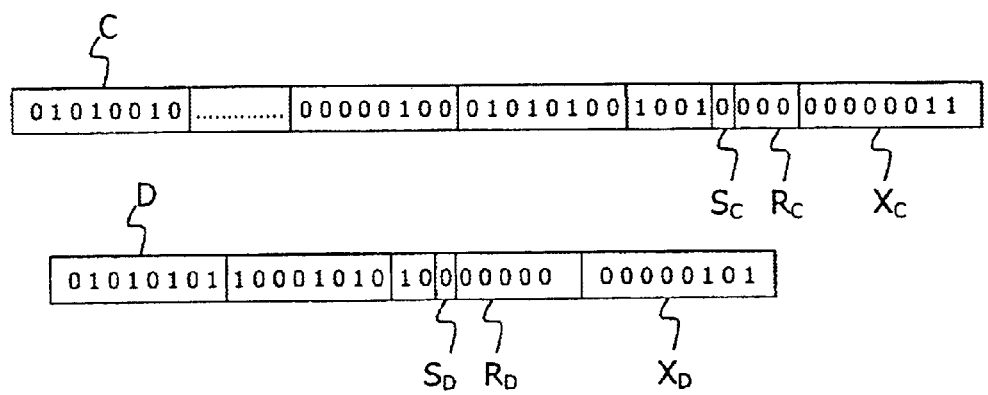
Figure 3:
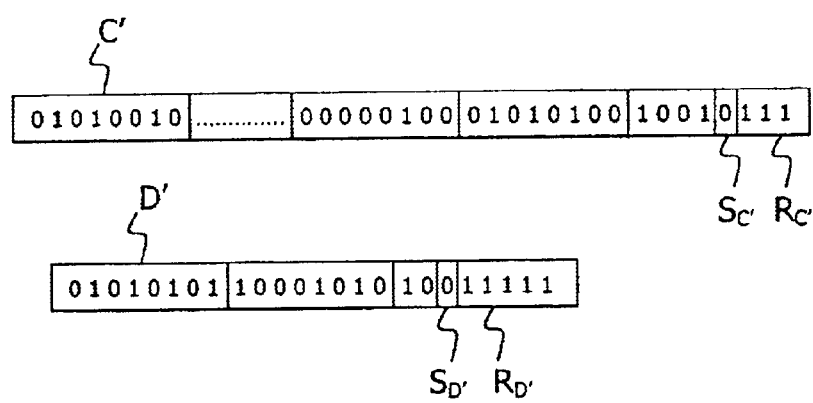
Figure 4:
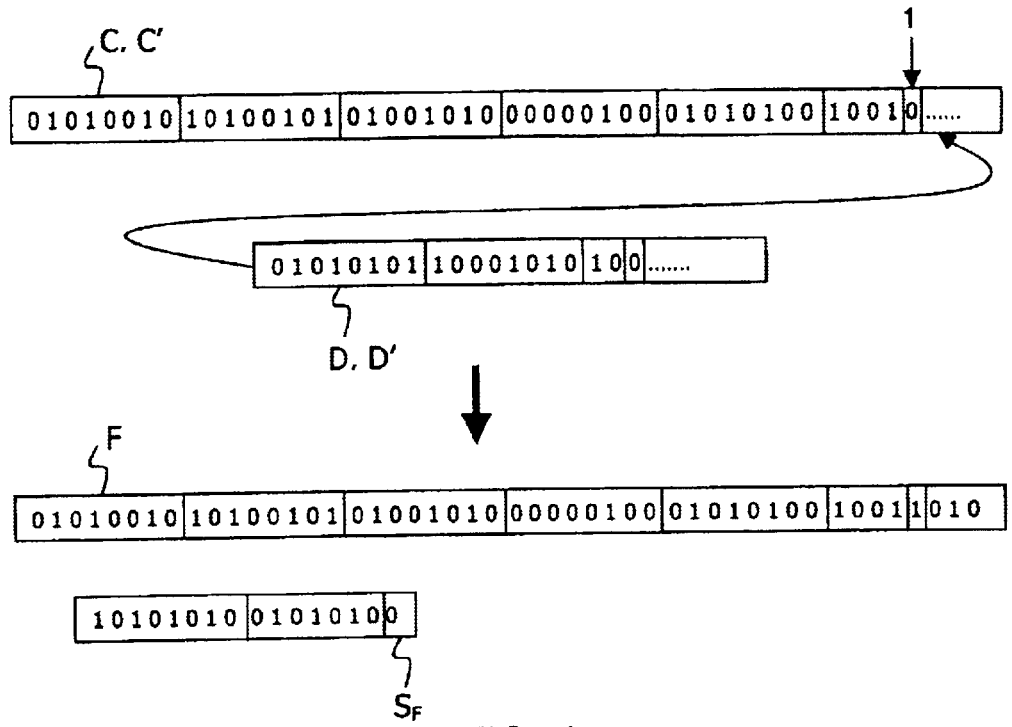
Figure 5:
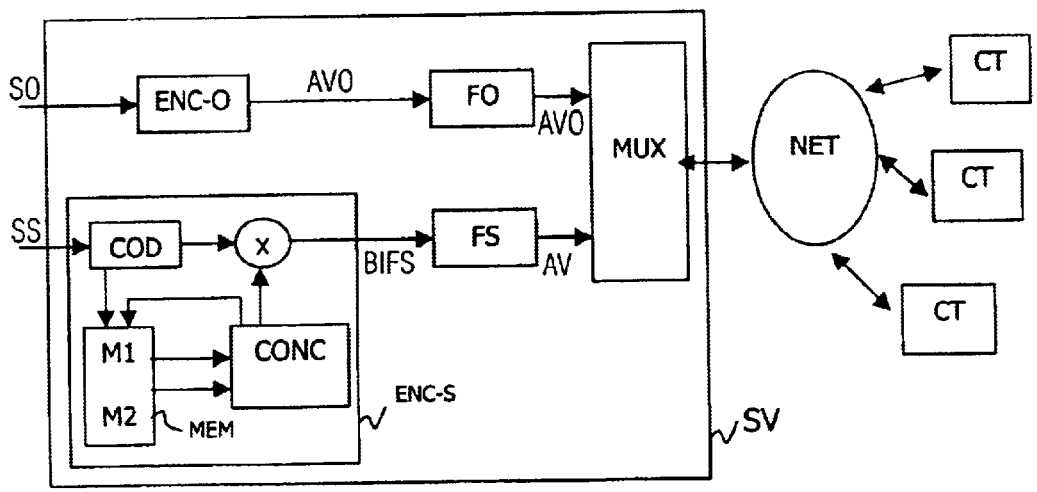

FIG. 1 shows an example of a BIFS command frame in accordance with the MPEG-4 standard, FIG. 2 shows an example of a BIFS command frame in accordance with a first embodiment of the invention, FIG. 3 shows an example of a BIFS command frame in accordance with a second embodiment of the invention, FIG. 4 is a diagram summarizing the working of a method of concatenating command frames according to the invention, FIG. 5 is a diagram of an example of a transmission system according to the invention, which activates a method of forming access points according to the invention.

The invention will now be described in the context of the MPEG-4 standard. This is not limitative. A method of concatenating command frames according to the invention is applicable to all types of frame with the same type of structure.

In the remainder of the description, the frames are subdivided in the traditional manner into words of 8 bits, currently referred to as octets.

In accordance with the MPEG-4 standard, a command frame comprises one or more commands including a last command. Each command contains a continue bit, the function of which is to indicate whether the command is followed by another command in the same frame or not. When the continue bit of a frame is TRUE, this command is followed by another command in the command frame. On the other hand, when it is FALSE, no other command follows, and the decoder ignores the rest of the frame. Only the last command of a frame has a continue bit configured to the value FALSE. A frame may only contain one single command. In that case, this sole command forms the last command of the frame.

The BIFS command frames as defined in the MPEG-4 standard may have any number of bits. In particular, this number of bits is not necessarily a multiple of 8. In practice, when a frame does not comprise a multiple of 8 bits, it is necessary to fill it with padding bits until an integer number of 8-bit words is obtained. These padding bits, which are placed after the continue bit of the last command of the frame, are not significant. They are ignored by the decoder. The last significant bit of a command frame is therefore the continue bit of its last command.

FIG. 1 shows a first command frame A which comprises 6 words of 8 bits. The last 3 bits are padding bits. They bear the reference $R_A$. The bit which precedes these 3 padding bits is the continue bit of the last command of frame A. It bears the reference $S_A$. A second command frame B comprises 3 words of 8 bits. The last 5 bits are padding bits. They bear the reference $R_B$. The bit which precedes these 5 padding bits is the continue bit of the last command of frame B. It bears the reference $S_B$.

In general, a command frame comprises a number of padding bits comprised between 0 and 7. These padding bits can have any value. In FIG. 1, they have been assigned the value "0" by way of example.

FIG. 2 shows, by way of example, two command frames C and D corresponding to a first embodiment of the invention. The command frame C contains all the words in the command frame A, but it also comprises a supplementary word bearing the reference $X_C$. The command frame D contains all the words in the command frame B, but it also comprises a supplementary word bearing the reference $X_D$. These supplementary words indicate the number of padding bits contained in the command frames C and D respectively. Like the command frame A, the command frame C contains $N_C=3$ padding bits. The supplementary word $X_C$ therefore corresponds to the coding of the value 3 out of 8 bits, or "00000011". Like the command frame B, the command frame D contains $N_D=5$ padding bits. The supplementary word $X_D$ therefore corresponds to the coding of the value 5 out of 8 bits, or "00000101". In general, in this first embodiment, the number of non-significant bits is equal to the number of padding bits, plus 8. It therefore lies between 8 and 15.

FIG. 3 shows, by way of example, two command frames C' and D' corresponding to a second embodiment of the invention. The command frames C' and D' contain all the words in the command frames A and B respectively, but the padding bits $R_{C'}$ and $R_{D'}$ no longer have any value: they are configured to an inverse value of that of the continue bits $S_{C'}$ and $S_{D'}$, that is to say 1. In general, in this second embodiment, the number of non-significant bits is equal to the number of padding bits. It therefore lies between 0 and 7.

FIG. 4 shows a diagram which explains the working of a concatenation method according to the invention in the case where the aim is to concatenate the command frames C and D shown in FIG. 2 (or the frames C' and D' shown in FIG. 3) for forming a new frame F.

Step a) comprises determining the position of the continue bit $S_C$ of the last command of the command frame C or C'.

In the first embodiment of the invention, the position of the continue bit $S_C$ is determined by reading the value $N_C$ indicated by the supplementary word $X_C$ of the command frame C.

In the second embodiment of the invention, the position of the continue bit $S_C$ is determined by reading the frame C' from the end onwards. By design, the continue bit is the first bit that is configured to "0", starting from the end of the frame.

Step b) comprises configuring the continue bit $S_C$ or $S_{C'}$ to the value TRUE (that is to say, to the logic "1" level in this embodiment), so as to indicate that, in the new frame F, the last command of the frame C or C' will be followed by another command.

Step c) comprises suppressing the non-significant bits of the command frame C or C'. In the first embodiment of the invention, these non-significant bits are the padding bits $R_C$ and the supplementary word $X_C$. In the second embodiment of the invention, the nonsignificant bits are the padding bits $R_{C'}$.

Step d) comprises inserting the significant bits of the command frame D after the continue bit $S_C$ or $S_{C'}$ (the padding bits and any supplementary word of the command D are not taken into account).

Step e) comprises completing the new command frame F obtained in this way, with padding bits $R_F$, so that it occupies an integer number of words.

In the first embodiment of the invention, an additional step can be provided in order to add, after the padding bits $R_F$, a supplementary word $X_F$ indicating the number of padding bits in the new command frame F. This embodiment is utilized when the frame F is likely to form the subject of a new concatenation. On the other hand, if the frame F is transmitted directly to the decoder, this additional step is not activated.

In the examples just described, the second command frame is also designed to allow the position of the continue bit of its last command to be determined. This allows the non-significant bits of the second frame to be determined, in order not to take them into account during the concatenation. In cases where the total of the numbers of padding bits $N_C$ and $N_D$ (or $N_{C'}$ and $N_{D'}$) of the first and second frames is greater than 8, this allows a word to be saved in the new frame obtained. This measure, whereas not essential, is therefore advantageous.

FIG. 5 shows an example of a transmission system according to the invention which comprises a server SV and a plurality of clients CT. The server SV receives a stream SO of audio/video objects and a stream SS of scene descriptions. It comprises an encoder of audio/video objects ENC-O for encoding the stream of audio/video objects SO and an encoder of scene descriptions ENC-S for encoding the stream of scene descriptions SS. The encoder for audio/video objects ENC-O supplies coded data AVO which is transmitted to a first formatting device FO. The encoder for scene descriptions ENC-S supplies BIFS command frames which are transmitted to a second formatting device FS. The formatting device FS supplies data units AU. Finally, a multiplexer MUX allows the formatted data AVO and AU emerging from the two formatting devices FO and FS to be multiplexed. The multiplexed data is transmitted by way of the transmission medium NET to the clients CT.

In accordance with the invention, the encoder for scene descriptions ENC-S comprises a coding block referred to as COD, a memory MEM which allows the data to be stored, a concatenation block CONC, and a switching block X for linking the input of the second formatting device FS either to the output of the coding block COD or to the output of the concatenation block CONC. The output of the concatenation block CONC is linked by way of advantage to the memory MEM. A first position M1 of the memory MEM is provided for storing the scene replacement frames. A second position M2 of the memory MEM is provided for storing the scene modification frames. The points of access to the BIFS stream are formed by concatenating command frames that are stored in said first and second positions M1 and M2 of the memory MEM. To do this, the concatenation device CONC reads a scene replacement command frame REP from the memory position M1 and a scene modification frame MOD from the memory position M2. Then, in accordance with the invention, it adds the command(s) of the frame MOD after the last command in the frame RAP. The result of this concatenation forms an access point AP. Optionally, the access point AP is subsequently stored in the first memory position M1 so as to be capable of itself forming the subject of concatenation with another scene modification frame MOD' previously stored in the second memory position M2.

What is claimed is:

1. A method of concatenating a first (C, C') and a second (D, D') frame each containing one or more commands, including a last command, the commands in a frame containing a continue bit ($S_C$, $S_{C'}$, $S_D$, $S_{D'}$) positioned so as to indicate whether another command is to follow in the frame or not, said frames comprising a number of non-significant bits among which a number of padding bits ($R_C$, $R_{C'}$) such that they occupy an integer number of words, and at least said first frame being designed to allow the position of the continue bit of its last command to be determined, said concatenation method comprising the following steps:

a) determination of the position of the continue bit of the last command of the first frame, b) modification of the continue bit of the last command of the first frame, c) suppression of the non-significant bits of the first frame, d) insertion of at least one command of the second frame after the modified continue bit, e) addition of a number of padding bits in order to form a new frame that occupies an integer number of words.

2. A method of concatenating frames as claimed in claim 1, characterized in that said non-significant bits comprise a supplementary word ($X_C$) placed after the padding bits, said padding bits being placed after the continue bit of the last command of the frame, and in that the supplementary word indicates the number of padding bits ($N_C$).

3. A method of concatenating frames as claimed in claim 1, characterized in that said padding bits are configured to an inverse value ("1") of that ("0") of said continue bit ($S_{C'}$) so as to allow the position of said continue bit to be determined.

4. A command frame (C, C', D, D') comprising at least a last command with a continue bit ($S_C$, $S_D$), and a number of padding bits ($R_C$, $R_D$) such that the frame occupies an integer number of words, characterized in that it comprises a supplementary word ($X_C$, $X_D$) placed after the padding bits, said padding bits being placed after the continue bit, and in that the supplementary word indicates the number ($N_C$, $N_D$) of padding bits.

5. A command frame comprising at least a last command with a continue bit ($S_{C'}$, $S_{D'}$), and a number of padding bits ($R_{C'}$, $R_{D'}$) so that the frame occupies an integer number of words, characterized in that said padding bits are configured to an inverse value of that of said continue bit.

6. A command frame as claimed in claim 4, characterized in that it is a BIFS command frame as described in recommendation ISO/IEC 14496-1.

7. An electronic apparatus comprising means (CONC) for activating a method of concatenating command frames as claimed in claim 1.

8. An electronic apparatus comprising means for transmitting a command frame as claimed in claim 4.

9. A method of forming an access point to a data stream comprising a step of storing command frames relating to a scene description (M1) and a step of storing at least one command frame relating to at least one scene modification (M2), characterized in that it comprises a step (CONC) for applying a concatenation method as claimed in claim 1, in order to concatenate said command frame relating to a scene description with said command frame relating to at least one scene modification, said access point being formed from the result of said concatenation.

10. A transmission system comprising at least one server (SV) and at least one client (CT), said server being intended to send data and command frames relating to said data to said clients, said server comprising means for applying a method of concatenating command frames as claimed in claim 1.

11. A computer program product comprising instructions for implementing a method of concatenating command frames as claimed in claim 1 when executed by a processor.

* * * * *